(12) United States Patent
Taillefer et al.

(10) Patent No.: US 8,800,234 B2
(45) Date of Patent: Aug. 12, 2014

(54) FASTENING SYSTEM FOR MODULAR CONTAINERS

(75) Inventors: Kevin Taillefer, Calgary (CA); Brett Adams, Okotoks (CA)

(73) Assignee: Titan Energy Services Ltd., Calgary (CA)

( * ) Notice: Subject to any disclaimer, the term of this patent is extended or adjusted under 35 U.S.C. 154(b) by 0 days.

(21) Appl. No.: 13/620,097

(22) Filed: Sep. 14, 2012

(65) Prior Publication Data
US 2014/0076891 A1 Mar. 20, 2014

(51) Int. Cl.
*E04B 2/00* (2006.01)

(52) U.S. Cl.
USPC .................... 52/587.1; 52/580; 220/682

(58) Field of Classification Search
USPC ............... 52/192, 245, 578, 580, 587.1; 220/600–692
See application file for complete search history.

(56) References Cited

U.S. PATENT DOCUMENTS

| | | | | |
|---|---|---|---|---|
| 1,429,220 A | * | 9/1922 | Blanton | 220/4.11 |
| 1,497,535 A | * | 6/1924 | Bell | 220/4.09 |
| 2,262,758 A | * | 11/1941 | Erne | 220/690 |
| 2,414,628 A | | 1/1947 | Battin | |
| 2,656,969 A | * | 10/1953 | Kvasnok et al. | 229/4.5 |
| 2,753,962 A | | 7/1956 | McBerty | |
| 2,823,826 A | | 2/1958 | Moore | |
| 3,552,775 A | | 1/1971 | Warner | |
| 3,648,303 A | * | 3/1972 | Stewart et al. | 52/5 |
| 3,819,079 A | * | 6/1974 | Levens | 220/4.13 |
| 4,454,694 A | | 6/1984 | Davanture | |
| 4,687,393 A | | 8/1987 | Thompson | |
| 6,647,562 B1 | | 11/2003 | Arout | |
| 7,559,715 B2 | | 7/2009 | Germain | |
| 7,966,786 B2 | * | 6/2011 | Koteskey | 52/745.19 |
| 8,365,937 B2 | * | 2/2013 | Lovelace et al. | 220/4.17 |
| 2004/0096276 A1 | | 5/2004 | Startteim | |
| 2008/0081739 A1 | | 4/2008 | Burnham | |
| 2011/0017742 A1 | * | 1/2011 | Sausen et al. | 220/324 |
| 2011/0194893 A1 | * | 8/2011 | Wiebe | 403/300 |
| 2012/0152960 A1 | | 6/2012 | Toews | |
| 2012/0223073 A1 | | 9/2012 | Lovelace | |
| 2013/0098929 A1 | * | 4/2013 | Lovelace et al. | 220/682 |

FOREIGN PATENT DOCUMENTS

| | | |
|---|---|---|
| CA | 1231902 | 1/1988 |
| EP | 0729903 A2 | 9/1996 |
| JP | 09-110087 A | 4/1997 |

* cited by examiner

*Primary Examiner* — Brian Glessner
*Assistant Examiner* — Adam Barlow
(74) *Attorney, Agent, or Firm* — Oyen Wiggs Green & Mutala LLP

(57) ABSTRACT

A fastening system for use with a modular panel assembly having at least two panels includes one or more securing apertures formed through a first panel and one or more engaging projections provided on a second panel, each one of the engaging projections being sized and positioned to be engageable with a corresponding one of the securing apertures on the first panel. Panels for use in forming a modular panel assembly, modular containers, and methods of constructing modular containers are provided.

22 Claims, 4 Drawing Sheets

FASTENING SYSTEM FOR MODULAR CONTAINERS

TECHNICAL FIELD

The present invention relates to fastening systems for containers, and in particular to fastening systems for modular containers comprising a plurality of panels.

BACKGROUND

Modular containers having a plurality of panels or segments that can be fastened together have a variety of uses. Some such containers can be of a significant size or volume. For example, some such containers are used to store fracturing fluids produced during hydraulic fracturing of oil or gas wells, drilling fluids produced when drilling an oil well or other type of well, temporary storage of potable water, storage of agricultural products, or storage of sand or other solids, or the like.

It is desirable to provide improved fastening systems for modular containers that facilitate the assembly and disassembly of such containers, while providing sufficient strength to ensure that the structure of the container is not compromised during use.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect, a fastening system for use with a modular panel assembly having at least two panels is provided. The fastening assembly has one or more securing apertures formed through a first panel and one or more engaging projections disposed on a second panel. Each one of the engaging projections is sized and positioned to be engageable with a corresponding one of the securing apertures on the first panel. The engaging projections can be sized and dimensioned to overlap the corresponding one of the securing apertures when the first and second panels are in the secured position. In some embodiments, overlap is achieved by engaging a notch defined between a leading edge of the engaging projection and the second panel with the corresponding one of the securing apertures.

In one aspect, a modular panel for use in forming a modular panel assembly is provided. The panel has a panel body, one or more securing apertures formed through a first end of the panel body, and one or more engaging projections on a second end of the panel body, each one of the engaging projections being sized to be engageable with a corresponding one of the securing apertures, and each one of the engaging projections being positioned at an elevation relative to a base of the panel that is substantially the same as the elevation of the corresponding one of the securing apertures. The engaging projections can be dimensioned to overlap the corresponding one of the securing apertures when the panel is assembled together with other panels. In some embodiments, the overlap is achieved by a notch defined between a leading edge of the engaging projection and the second end of the panel body, the notch being positioned to engage with a corresponding one of the securing apertures when the panel is assembled together with other panels.

In one aspect, a method of assembling a modular container is provided. At least first and second panels are provided, each one of the panels having one or more securing apertures formed through a first end of the panel and one or more engaging projections on a second end of the panel. The first and second panels are aligned together in overlapping end-to-end relationship and the engaging projections on the first panel are inserted through the securing apertures on the second panel. The steps of aligning further panels in overlapping end-to-end relationship and inserting the engaging projections on one panel through the securing apertures on the next panel are repeated for each successive panel until the container is assembled. The step of inserting the engaging projections on the first panel through the securing apertures on the second panel can include securing the securing aperture in a notch defined between the engaging projection and the first panel.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Figure 1:
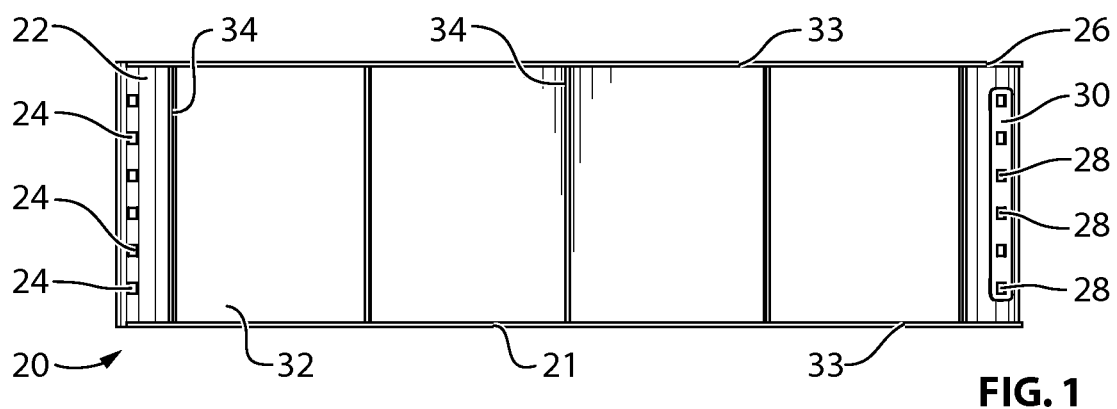
FIG. 1 is a perspective view of a panel for constructing a modular container having a fastening system according to one embodiment.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

For ease of reference herein, the term "vertical" is used to describe the relative location of features with reference to the orientation of the panels shown in the drawings and as such panels would typically be oriented during use. It will be appreciated that the subject matter described herein could have other orientations (for example, panels could be laid flat for shipping or storage), in which case one skilled in the art would appreciate that the relative orientation of the direction that has been described herein as "vertical" could in fact extend in some other direction, such as a horizontal direction, and that subject matter having such orientations falls within the scope of the appended claims.

With reference to FIG. 1, an exemplary embodiment of a panel 20 for use in a modular tank assembly is illustrated. Panel 20 is generally rectangular in shape and has a male end 22 having a plurality of engaging projections 24 extending outwardly therefrom and a female end 26 having a plurality of corresponding securing apertures 28 formed therein. In some embodiments, panel 20 could have other shapes, for example, generally square. In some embodiments, panel 20 can be constructed from a plurality of panel segments that have been welded or otherwise secured together in any suitable manner to provide a panel 20 of a size larger than the individual panel segments. It will be apparent that the shape of panel 20 need not be strictly square or rectangular in shape; for example, the ends of panel 20 could be somewhat angled without interfering with the function of panel 20.

Panel 20 has a lower edge, illustrated as base 21. Each one of engaging projections 24 is positioned at approximately the same vertical elevation above base 21 as a corresponding one of the securing apertures 28. The engaging projections 24 are dimensioned to be engageable with the corresponding securing aperture 28. For example, in the illustrated embodiment, the engaging projections 24 are generally square in shape when viewed from the outer side of panel 20 and the securing apertures 28 are generally square in shape, such that engaging projections 24 can be inserted through securing apertures 28 and then retained in a secured position (i.e. engaging projections 24 are engageable with securing apertures 28). In other embodiments, the securing apertures and engaging projections could independently be rectangular, circular, pentagonal, hexagonal or the like, or asymmetrical in shape, when viewed from the outer side of panel 20, so long as the engaging projections are engageable with the securing apertures.

In the illustrated embodiment, engaging projections 24 and corresponding securing apertures 28 have been illustrated as being relatively evenly spaced along the height of panel 20. In some embodiments, the elevations of engaging projections 24 and each one of the corresponding securing aperture 28 can be varied or made less even along the height of panel 20. In some embodiments, a larger number of engaging projections and corresponding securing apertures 28 are provided on the lower half of panel 20 than on the upper half of panel 20. Any number and location of engaging projections 24 and corresponding securing apertures 28 may be used as appropriate for the particular application. In the illustrated embodiment, six evenly spaced engaging projections 24 and six corresponding securing apertures 28 are provided. In one exemplary embodiment, eight engaging projections 24 and eight securing apertures 28 are provided on each panel 20. In one such embodiment, more engaging projections 24 and securing apertures 28 are provided on the lower half of panel 20 than on the upper half of panel 20; for example, five engaging projections 24 and five securing apertures 28 are provided on the lower half of panel 20 and three engaging projections 24 and three securing apertures 28 are provided on the upper half of panel 20. Other arrangements of engaging projections 24 and securing apertures 28 may be used.

In the illustrated embodiment, a reinforcing panel 30 is provided at female end 26 to reinforce the structure of panel body 32 at securing apertures 28. Reinforcing panel 30 has a plurality of apertures therethrough, positioned to overlie securing apertures 28 so that engaging projections can readily be engaged with securing apertures 28. Reinforcing panel 30 can be welded or otherwise securely fastened in any suitable manner to panel body 32. In some embodiments, such as the embodiment illustrated in FIG. 8, reinforcing panel 30 is not present.

To reinforce the structure of panel body 32, in the illustrated embodiment top and bottom support members 33 are provided. One or more spaced apart reinforcing ribs 34 are provided that extend vertically along the height of panel body 32 to provide added strength. In some embodiments, reinforcing ribs 34 are omitted. In some embodiments, top and/or bottom support members 33 are omitted.

Suitable materials for the manufacture of all components of panels 20, including top and bottom support members 33 and reinforcing ribs 34, include carbon steel, stainless steel, corrugated steel, aluminum, composite, fibreglass-reinforced plastic (FRP), or the like. Different components of panel 20 could independently be made from different materials. The selection of suitable materials depending on the desired application (e.g. nature and volume of the material to be contained, environmental conditions under which the panels will be used, and the like) and manufacture of the components described herein is within the skill of one knowledgeable in the art. For example, engaging projections 24 can be machined separately from the panel body 32 and then welded on to panel body 32, or otherwise integrally formed with or joined to panel body 32 in any suitable manner.

Figure 2:
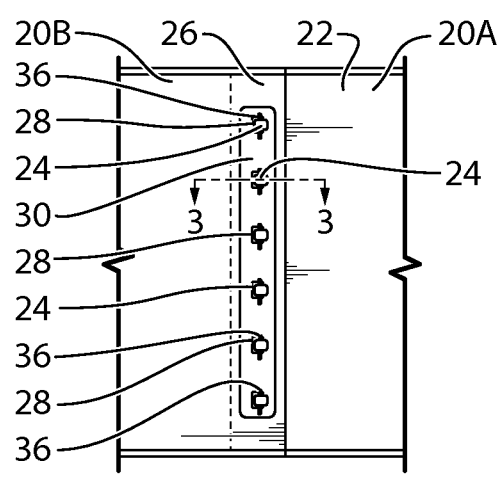
FIG. 2 is an enlarged partial view showing the connection of two panels according to the embodiment of FIG. 1.

FIG. 2 shows a partial view of two panels 20A and 20B connected by engagement of engaging projections 24 on male end 22 of first panel 20A with securing apertures 28 on female end 26 of second panel 20B. To connect panels 20A and 20B, the panels are aligned in overlapping end-to-end relationship. Each one of the engaging projections 24 is passed through a corresponding one of the securing apertures 28, i.e. the securing aperture 28 that is at approximately the same vertical elevation relative to base 21 on panel 20B as the engaging projection 24 relative to base 21 on panel 20A, and slid into place so that a notch 40 (FIG. 3) formed between panel 20A and each one of the engaging projections 24 engages the securing apertures 28 of panel 20B to hold the panels in a secured position. In the secured position in the illustrated embodiment, engaging projections 24 overlap with female end 26, i.e. a portion of female end 26 is nested within slot 40, and when viewed from the outside of panels 20A and 20B, a portion of engaging projections 24 obscures a portion of female end 26 from view.

In some embodiments, including the illustrated embodiment, a locking member 36 is inserted through a slot 38 (best shown in FIG. 3) formed in the engaging projection 24 to hold the engaging projection in place in the secured position. In the illustrated embodiment, slot 38 is formed vertically through engaging projection 24, on the edge of engaging projection 24 that is coupled to panel 20. Slot 38 could have other shapes, e.g. triangular, square, pentagonal, hexagonal or the like, rounded or asymmetrical in cross-section, so long as locking member 36 is correspondingly shaped to removably engage with slot 38.

Figure 3:
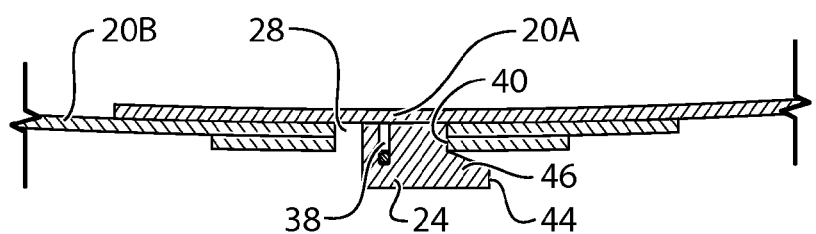
FIG. 3 is an enlarged partial sectional view showing the engagement between one of the engaging projections of FIG. 2 and its corresponding securing aperture.

With reference to FIG. 3, the overlapping engagement in the secured position of one engaging projection 24 on a first panel 20A with a corresponding securing aperture 28 on a second panel 20B is shown in greater detail. In the illustrated embodiment, notch 40 is formed in a leading edge 44 of engaging projection 24 (i.e. the edge of the engaging projection that makes securing contact with the securing aperture 28). Leading edge 44 is also shaped to provide an inwardly angled surface 46 (i.e. a surface angled toward the inside of a container to be made by assembling panels 20A and 20B) that tapers inwardly toward notch 40. Exemplary angles for inwardly angled surface 46 relative to leading edge 44 of engaging projection 24 are in the range of 15° to 75°.

Figure 5:
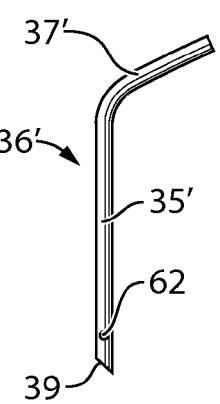
FIG. 5 is a top view of an alternative embodiment of an engaging projection.

Angled surface 46 can facilitate assembly of panels 20A and 20B by allowing engaging projection 24 to be readily slid into the secured position within securing aperture 28. In some embodiments, for example as shown in FIG. 5, angled surface 46 is not present. In some embodiments, angled surface 46 has some other shape to facilitate assembly of panels 20A and 20B, for example gently curved. Angled surface 46 can help to bring panel 20A into proper alignment with panel 20B during assembly. In some embodiments, angled surface 46 is not present.

The overlapping engagement of engaging projections 24 with securing apertures 28 keeps panels 20A and 20B joined in close contact when a container formed from a plurality of such panels is in use. Without being bound by theory, it is believed that keeping the panels in close contact reduces the moment forces on engaging projections 24 during use of the container. For example, if there is a gap of even 0.25 inches during operation, the moment on engaging projection 24 is doubled from that encountered during normal use when the panels are in close contact. Even during normal use, there will be a moment on engaging projection 24 that will tend to cause the load bearing face of engaging projection 24 to rotate slightly outwards. The overlapping engagement of engaging projections 24 with securing apertures 28 achieved by notch 40 ensures that the securing apertures 28 cannot slide off the engaging projections 24 due to stress experienced during normal use.

After engaging projections 24 have been slid into the secured position within securing apertures 28, in some embodiments a plurality of locking members 36 are slid through slots 38 on engaging projections 24 to secure panels 20A and 20B in the assembled position.

Figure 4:
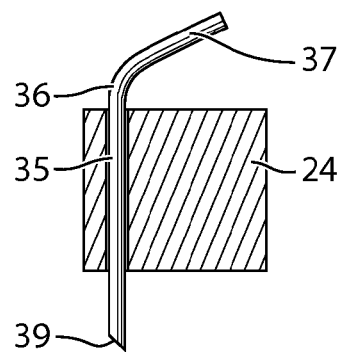
FIG. 4 is a partial cross-sectional view showing the engagement of a locking member with an engaging projection.

With reference to FIG. 4, in the illustrated embodiment, locking member 36 is a pin formed from a square piece of steel, although any suitable material in any suitable configuration could be used to provide locking member 36. Locking member 36 is bent to provide a vertically extending securing portion 35 that is complementary in shape to slot 38 so as to be removably engageable with slot 38. The bend in locking member 36 also provides a horizontally or partially horizontally extending portion 37 that prevents locking member 36 from sliding downwardly through slot 38 and facilitates installation and removal of locking member 36 by allowing it to be easily grasped. Other mechanisms for preventing locking member 36 from sliding downwardly through slot 38 could be used, for example, a retaining pin, cotter pin, or the like. Other shapes or structural features could be used to prevent locking member 36 from sliding downwardly through slot 38. For example, in one embodiment, the locking member is "L"-shaped, so that it has a vertically extending portion that can be passed through slot 38 and a horizontally extending portion extending outwardly at approximately a 90° angle therefrom to provide a horizontally extending portion that prevents locking member 36 from sliding downwardly through slot 38.

In some embodiments, including the illustrated embodiment, the bottom end of locking member 36 is provided with a tapered surface 39 at its bottom end, which can facilitate insertion of locking member 36 through slot 38.

Figure 6:
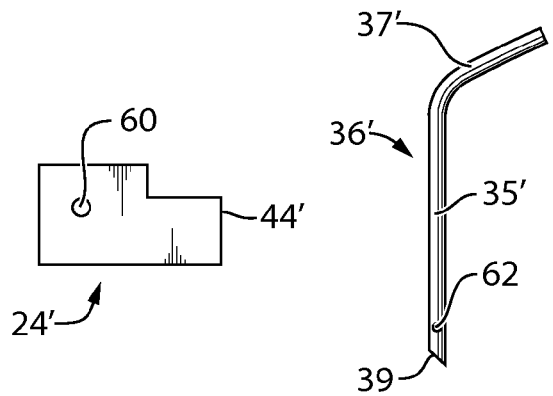
FIG. 6 is a side view of an embodiment of a locking member for use with the engaging projection of FIG. 5.

Other structures could be used to secure the engaging projections in the secured position. For example, as illustrated in FIG. 5, an alternative embodiment of an engaging projection 24' is shown. Engaging projection 24' is generally similar to engaging projection 24, but in place of slot 38, engaging projection 24' is provided with a generally circular aperture 60 formed vertically therethrough. In this embodiment, the locking member 36' (FIG. 6) to be inserted through aperture 60 would be generally cylindrical in shape (i.e. with a generally circular cross-section) so as to be removably insertable through aperture 60. Like locking member 36, locking member 36' could optionally be bent to provide a vertically extending securing portion 35' that is complementary in shape to aperture 60 so as to be removably engageable therewith. Locking member 36' can be provided with a horizontally or partially horizontally extending portion 37' to prevent locking member 36' from sliding downwardly through aperture 60 and to facilitate installation and removal of locking member 36' by allowing it to be easily grasped. Locking member 36' can optionally be provided with a tapered surface 39 at its bottom end, which can facilitate insertion of locking member 36' thorough aperture 60.

In the embodiment illustrate in FIG. 5, leading edge 44' of engaging projection 24' does not have an inwardly angled surface.

In some embodiments, a secondary securing member could be provided to secure the locking members in place during transportation. For example, an aperture (illustrated as 62 in FIG. 6) could be provided through the lower portion of the vertically extending portion 35 or 35' of locking member 36 or 36' and a cotter pin or other retaining member passed therethrough to retain locking member 36 or 36' on engaging projection 24 during storage and transport (for example, so that locking members 36 or 36' are not lost during transportation).

Figure 7:
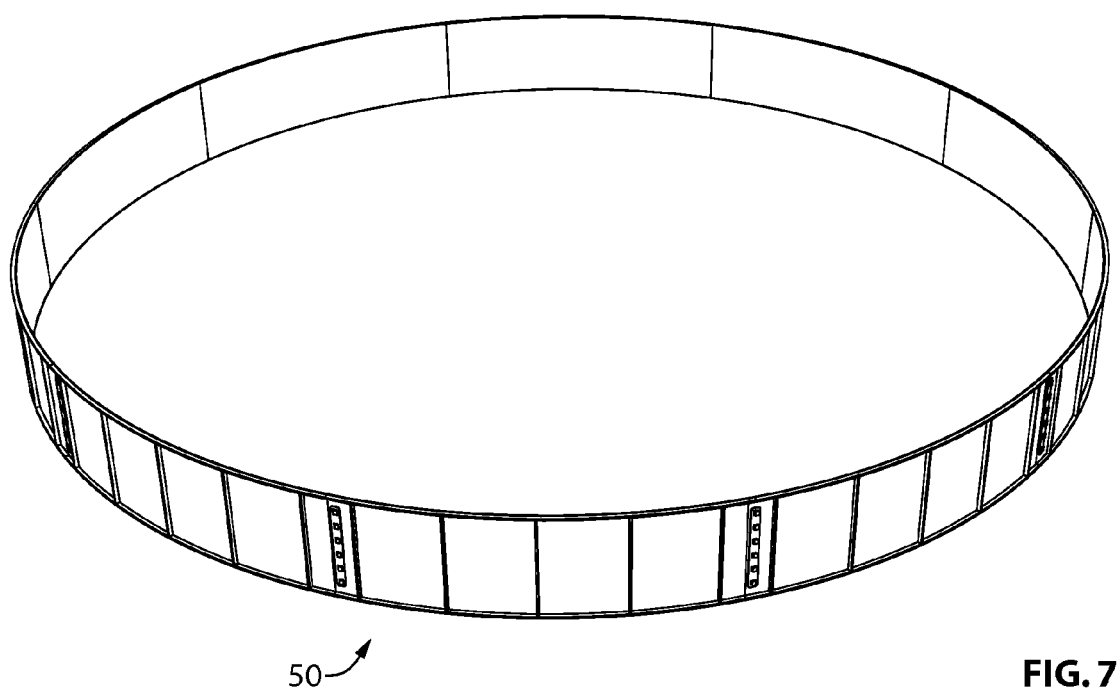
FIG. 7 is a perspective view of a container formed by the overlapped end-to-end connection of a plurality of the panels illustrated in FIG. 1.

As illustrated in FIG. 7 a plurality of panels can be assembled together in overlapping end-to-end relationship in a similar manner as described for panels 20A and 20B to form a container 50. In some embodiments, each one of the panels 20 is curved across its length, as illustrated in FIG. 7. The number of panels required to form container 50 can be varied by varying the degree of curvature of each one of the panels 20 used to assemble container 50. For example, a container could be assembled from two panels if each panel is semi-circular in shape. Decreasing the curvature of each one of the panels would require the use of additional panels to form a container, and would increase the diameter and useable volume of the container.

In the illustrated embodiment, engaging projections 24 project outwardly from panel body 32, i.e. toward the outside of the container formed by assembling panels 20. Providing engaging projections 24 on the outside of container 50 can facilitate assembly of container 50 (e.g. because assembly of panels 20 can be accomplished from the outside of container 50), and/or can assist in providing a smooth surface within container 50 (which can assist in avoiding leaks if container 50 is to be lined or used to store liquid). In alternative embodiments, the panels could be configured so that the engaging projections project inwardly through the securing apertures. In some such embodiments, the orientation of angled surface 46, where present, is correspondingly reversed relative to the embodiment described above, i.e. angled surface 46 would be outwardly angled relative to the leading edge of engaging projection 24, which would be on the inward side of the container.

Figure 8:
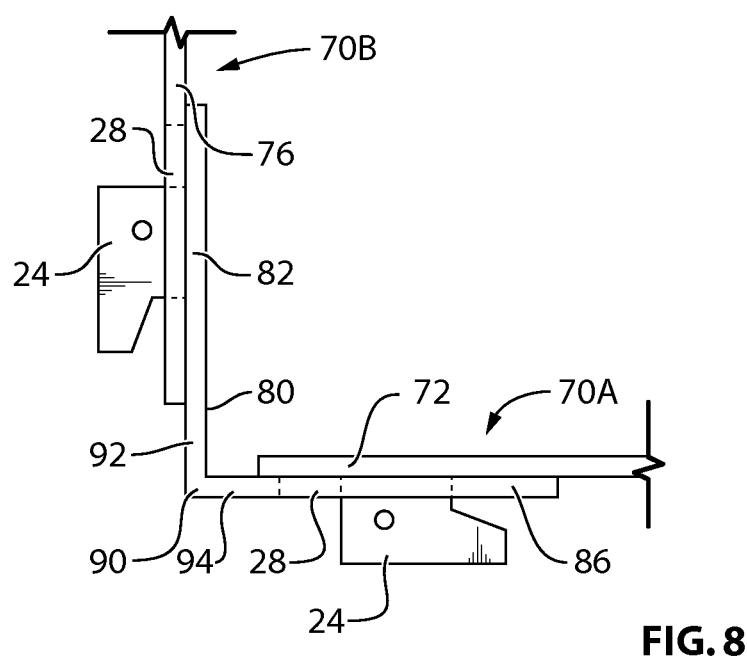
FIG. 8 is a schematic partial top view showing the engagement of a pair of flat panels with an angled panel according to one embodiment.

In some alternative embodiments, containers having a variety of shapes could be made by using panels having flat or relatively flat sides. For example, as illustrated in FIG. 8, a pair of flat panels 70A, 70B having a male end 72 and a female end 76 are connected with an angled panel 80 to form a right angle corner. By "flat panels", it is meant that the panels 70A and 70B are generally straight (i.e. are not curved) along their length, so that the shape made by assembling a plurality of such panels has straight or generally straight edges, rather than being circular. Angled panel 80 has a male end 82 having a plurality of engaging projections 24 and a female end 86 having a plurality of corresponding securing apertures 28. Angled panel 80 also has an angled portion 90 defined between two flat portions 92 and 94 so that corners of a container can be formed as described below.

The engaging projections 24 on male end 82 of angled panel 80 are engaged with the securing apertures on panel 70B. The securing apertures 28 on female end 86 of angled panel 80 are engaged with engaging projections 24 on panel 70A to form a corner of a container. A plurality of panels similar to panels 70A and 70B can be connected together in overlapping end-to-end relationship with angled panels 80 in like manner to form an enclosed container. In the illustrated embodiment, angled portion 90 forms a 90° angle, and thus angled panel 80 could be used to form square or rectangular containers. Varying angles of angled portion 90 could be used to form other shapes, for example angles of 108° can be used to form a pentagonal container, angles of 135° can be used to form an octagon, and so on. It would be within the ability of one skilled in the art to select varying lengths of panels 70A and 70B and magnitudes of angled portion 90 to produce an enclosed container that is symmetrical or asymmetrical in shape with straight or generally straight edges.

If desired, for example where container 50 will be used to contain liquids, a suitable liner (not shown) can be inserted in container 50 prior to loading the material to be contained into container 50.

The size of container 50 can be varied by varying the dimensions and/or degree of curvature of panels 20. In some embodiments, container 50 is dimensioned to hold a volume of between 600,000 L and 8,000,000 L. Container 50 can be used to contain any desired material, whether liquid or solid. In some embodiments, container 50 is used to store fracturing fluids produced during hydraulic fracturing of oil or gas wells, or drilling fluids produced when drilling an oil well or other type of well. In other embodiments, container 50 is used for temporary potable water storage, agricultural product storage, or storage of sand or other solids, or the like.

To disassemble container 50, the contents of container 50 are removed, any liner lining container 50 is removed, locking members 36 are removed from slots 38 (after removal of any secondary securing member such as a cotter pin, if used), and engaging projections 24 are slid out of securing apertures 28 to disconnect each adjacent panel 20. Individual panels can then be stacked or crated for storage or shipping, if desired.

While a number of exemplary aspects and embodiments have been discussed above, those of skill in the art will recognize certain modifications, permutations, additions and sub-combinations thereof. For example, although a preferred embodiment of a panel suitable for use to form a container for the storage of large volumes of liquid has been described in detail herein, other forms of panel constructed of other types of material could be made employing the same fastening system to store lighter materials or smaller quantities. It is therefore intended that the following appended claims and claims hereafter introduced should not be limited to the preferred embodiments described above, but should be given the broadest interpretation consistent with the specification as a whole.

What is claimed is:

1. A fastening system for use with a modular panel assembly comprising at least two panels, the fastening assembly comprising:
    one or more securing apertures formed through a thickness of a first panel; and
    one or more engaging projections disposed on and projecting outwardly from a second panel, each one of the engaging projections being sized and positioned to be engageable with a corresponding one of the securing apertures on the first panel, at least one of the engaging projections comprising a notch defined between a leading edge of the engaging projection and the second panel, the notch engaging with the corresponding one of the securing apertures when the panels are in a secured position, and at least one of the engaging projections being sized and dimensioned to overlap with the corresponding one of the securing apertures when the first and second panels are in the secured position so that a leading edge of the engaging projection extends over a portion of the body of the first panel in a plane parallel to the body of the first panel.

2. A fastening system as defined in claim 1, comprising one or more locking members for securing each one of the engaging projections in its corresponding securing aperture.

3. A fastening system as defined in claim 1, wherein each one of the securing apertures on the first panel is positioned at approximately the same vertical elevation as the corresponding one of the engaging projections on the second panel.

4. A fastening system as defined in claim 2, wherein the engaging projections comprise a vertical slot on an inner portion of the engaging projection for receiving the locking member.

5. A fastening system as defined in claim 4, wherein each one of the locking members comprises a square pin.

6. A fastening system as defined in claim 1, comprising an inwardly angled surface on a leading edge of the engaging projections, the inwardly angled surface being angled inwardly from the leading edge of the securing projection to the notch, wherein the angle formed between the inwardly angled surface and the leading edge of the engaging projection is between about 15° and 75°.

7. A fastening system as defined in claim 1, wherein the engaging projections and the securing apertures are independently square, rectangular, round, pentagonal or hexagonal in shape when viewed from an outside of the first and second panels.

8. A tank for storing fracturing fluids produced during hydraulic fracturing of oil or gas wells formed from a plurality of modular panels having a fastening system as defined in claim 1.

9. A fastening system as defined in claim 1, wherein the first and second panels and the engaging projections comprise a rigid material.

10. A fastening system as defined in claim 9, wherein the rigid material comprises carbon steel, stainless steel, corrugated steel, aluminum, composite, or fiberglass-reinforced plastic.

11. A modular panel for use in forming a modular panel assembly, the panel comprising: a panel body;
    one or more securing apertures formed through a thickness of a first end of the panel body;
    one or more engaging projections on and projecting outwardly from a second end of the panel body, each one of the engaging projections being sized to be engageable with a corresponding one of the securing apertures on a second panel, at least one of the engaging projections comprising a notch defined between a leading edge of the engaging projection and the panel body, the notch engaging with the corresponding one of the securing apertures on the second panel when the panels are assembled in a secured position, and each one of the engaging projections being positioned at an elevation relative to a base of the panel that is substantially the same as the elevation of the corresponding one of the securing apertures, at least one of the engaging projections being dimensioned to overlap the corresponding one of the securing apertures when a plurality of the panels are assembled in the secured position so that a leading edge of the engaging projection extends over a portion of the panel body in a plane parallel to the panel body of the second panel.

12. A modular panel as defined in claim 11, wherein the engaging projections comprise a vertical slot on an inner portion of the engaging projection for receiving a locking member.

13. A modular panel as defined in claim 11, wherein the panel is curved, and wherein the engaging projections extend from an outer side of the curved panel.

14. A modular panel as defined in claim 11, comprising an inwardly angled surface on a leading edge of the engaging projections, the inwardly angled surface being angled inwardly from the leading edge of the securing projection to the notch.

15. A modular panel as defined in claim 11, wherein the engaging projections and the securing apertures are independently square, rectangular, round, pentagonal or hexagonal in shape when viewed from the outside of the panel.

16. A modular container comprising two or more panels as defined by claim 11.

17. A tank for storing fracturing fluids produced during hydraulic fracturing of oil or gas wells comprising a modular container as defined in claim 16.

18. A modular panel as defined in claim 11, wherein the panel body and the engaging projections comprise a rigid material.

19. A modular panel as defined in claim 18, wherein the rigid material comprises carbon steel, stainless steel, corrugated steel, aluminum, composite, or fiberglass-reinforced plastic.

20. A method of assembling a modular container comprising:

providing at least first and second panels, each one of the panels having one or more securing apertures formed through a thickness of a first end of a body of the panel and one or more engaging projections on a second end of the panel;

aligning the first and second panels in overlapping end-to-end relationship; inserting the engaging projections on the first panel through corresponding securing apertures on the second panel and securing each one of the securing apertures in a notch defined between the corresponding engaging projection and the first panel so that a leading edge of the engaging projection extends over a portion of the body of the second panel in a plane parallel to the body of the second panel; and repeating the steps of aligning the panels and inserting the engaging projections through the securing apertures for each successive panel to assemble the container.

21. A method as defined in claim 20, comprising inserting a locking member through a slot formed through an inner portion of each one of the engaging projections to hold the engaging projections within the securing apertures.

22. A method as defined in claim 20, wherein securing each one of the securing apertures in a notch defined between the corresponding engaging projection and the first panel comprises allowing each one of the securing apertures to slide inwardly on an inwardly angled surface provided on a leading edge of each one of the engaging projections, the inwardly angled surface being angled inwardly from the leading edge of the securing projection to the notch.

* * * * *